Figure 1:
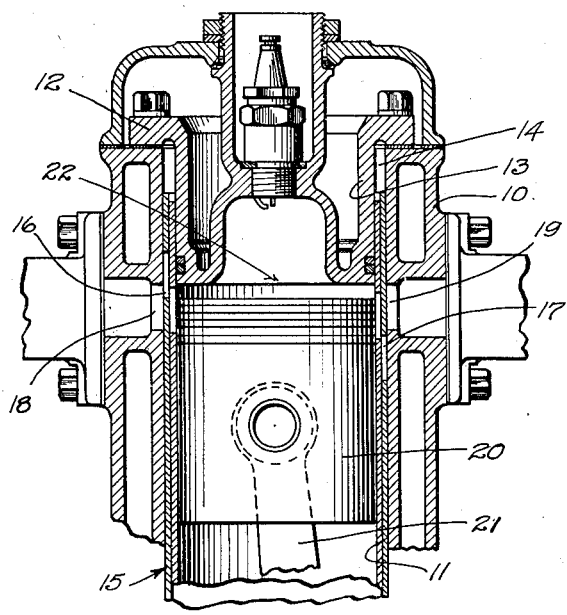

Sept. 18, 1934.  A. J. MEYER  1,973,876

ENGINE

Filed April 17, 1931

INVENTOR.

ANDRE J. MEYER.

BY

ATTORNEY.

Patented Sept. 18, 1934

1,973,876

UNITED STATES PATENT OFFICE 1,973,876

ENGINE

Andre J. Meyer, Detroit, Mich., assignor to Continental Motors Corporation, Detroit, Mich., a corporation of Virginia Application April 17, 1931, Serial No. 530,844

10 Claims. (Cl. 123—75)

My invention relates to internal combustion engines and more particularly to engines of the reciprocating sleeve valve type and including double sleeve valve engines of the Knight type with special reference to the construction thereof and the means for especially preparing the fuel mixture for combustion as determined by the combustion knock tendency and detonation characteristics of the engine.

The present invention is a further embodiment of my co-pending application, Serial No. 522,838, filed March 16, 1931, and pertains more particularly to an engine having multiple sleeve valves.

Experience has proved the fact that swirling of the fuel mixture in the combustion chamber reduces detonation thereby permitting the construction of an engine with a relatively higher compression ratio. However, swirling of the fuel mixture produces a stratification of the fuel mixture charge, producing a relatively leaner mixture at the center of the combustion chamber than at the outer peripheral portion of the combustion chamber where the heavier fuel particles are thrown by centrifugal force.

This relatively lean fuel mixture at the center of the combustion chamber will burn more rapidly than the heavier and relatively rich fuel mixture around the outside of the combustion chamber. As the swirling of the fuel mixture is relatively increased, the fuel mixture at the center of the combustion chambers becomes more lean with the result that the flame travel becomes more rapid thereby producing an objectionable combustion knock. This combustion knock is not audible with a relatively small amount of swirl, and thus I find it advisable to construct the engine with some swirl in order to obtain the maximum of benefits in regard to detonation but to limit the swirl to an amount which will not produce an audible and objectionable combustion knock.

I have determined by experiment, the various swirl speeds which occur in the combustion chamber and at various points therein with the use of a light, sensitive vane rotor exposed to the swirl and having a rotatable shaft projecting outside the engine combustion chamber, the shaft providing an accurate means for counting the R. P. M. of the vane and swirling fuel mixture. While the most favorable R. P. M. of swirl will vary at different engine speeds and with different size engines, I have found that swirl for ordinary mixture ranging in the neighborhood of 3000 to 5000 R. P. M. is very beneficial in ordinary sizes of sleeve valve engines of the size used in the automotive industry.

It is plain that improved operating characteristics may be imparted to reciprocating sleeve valve internal combustion engines including engines of the Knight type in which no swirl is customarily provided by inducing a predetermined swirl to the fuel mixture in such engines.

It is the object of my invention to thus improve in general the operating characteristics of an internal combustion engine of the aforesaid type by inducing a predetermined directional movement to the fuel mixture in the combustion chamber as determined by the combustion knock tendency and detonation characteristics of the engine.

Figure 2:
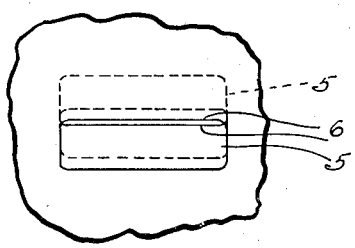
Figure 3:
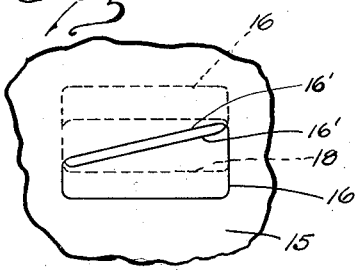
Figure 4:
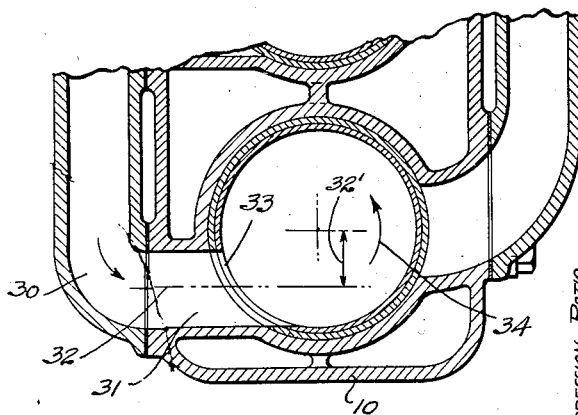
Figure 6:
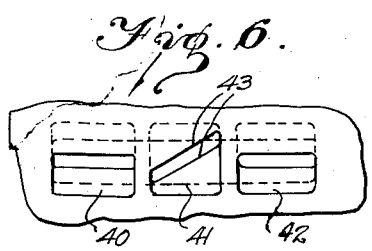
Figure 5:
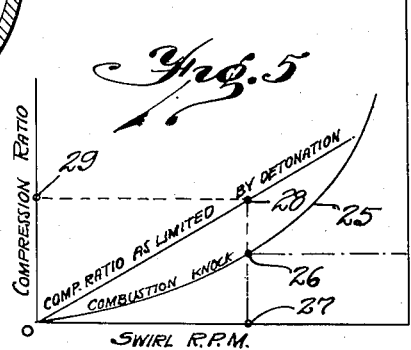

For a more detailed understanding of my invention, reference may be had to the accompanying drawing which illustrates preferred embodiments of my invention, and in which:

Figure 1 is a vertical sectional view through a porton of a sleeve valve engine illustrating an engine of the Knight type, Figure 2 is a detail diagrammatic view illustrating the customary Knight type of sleeve valve ports, Figure 3 is a detail diagrammatic view of sleeve valve intake ports showing one embodiment of my invention, Figure 4 is a horizontal sectional view through a portion of the Knight type illustrating a construction in which a predetermined directional movement is imparted to the fuel mixture externally of the combustion chamber, Figure 5 is a diagrammatic representation of the detonation and combustion knock curves, and Figure 6 is a detail diagrammatic view of a further modified construction.

The illustrated embodiment of my invention is shown in connection with an internal combustion engine of the Knight sleeve valve type in which the sleeves are reciprocated but not oscillated, and in general includes a cylinder block 10 having a cylinder 11 and a cylinder head 12 secured thereto and provided with a re-entrant head portion 13 depending within the cylinder and spaced therefrom to provide a sleeve valve pocket 14 adapted for receiving the upper end of the sleeve valve means 15. In the aforesaid type of engine the sleeve valve means consists of a plurality of movable sleeves, two such sleeves being preferably employed and provided with cooperating intake and exhaust ports 16 and 17 respectively which are cooperatively associated with cylinder intake and exhaust ports 18 and 19. A piston 20 operates within the sleeves and is preferably connected with an engine crankshaft (not shown) by means of a connecting rod 21. The combustion chamber in the engine illustrated in the accompanying drawing is designated 22 and is bounded by the cylinder head 12 and the top face of the piston 20.

It is customary with engines of the aforesaid type to provide cooperating sleeve intake ports having opening edges 6 extending in a horizontal plane perpendicular to the cylinder and sleeve valve axes as shown in Figure 2. It will be noted that such a construction does not induce any appreciable horizontal swirl of the fuel mixture in the combustion chamber.

It is necessary with engines of this character to determine first the correct amount of swirl which is desirable to be produced within the combustion chamber and this may be determined by experiment or by computations, Figure 5 illustrating in a general way how this required swirl may be determined.

Before discussing the illustrative curves in Figure 5 I will define the terms and expressions used herein. First of all, I will distinguish between combustion knock and detonation. These terms both refer to well known phenomena occurring during the process of combustion of the gasoline fuel mixture within engine combustion chambers.

Detonation is characterized by a high pitched metallic sound and occurs during burning of approximately the last ten percent of the fuel mixture charge. It is not a theoretical phenomenon but is well known and has been photographed. It is a substantially instantaneous ignition of the last part of the charge in the combustion chamber, taking place at various points throughout the charge as distinguished from the progressive burning of the charge during earlier stages of the combustion process.

Combustion knock is characterized by an entirely different sound than that produced by detonation. It is evidenced by a low pitch thumping or rough sound and is primarily produced by sudden taking up of clearances of the parts between the usual engine piston and crankshaft. Combustion knock takes place during the early stages of combustion and is caused by a too rapid initial flame propagation. In addition to its being evidenced by the aforesaid sound, it is evidenced in the usual indicator cards showing a very rapid initial pressure rise, causing sudden taking up of clearances as stated above.

As stated in the first part of the specification the combustion knock is relatively increased proportional to the increase of swirl. In Figure 5 I have diagrammatically shown a curve 25 which represents the combustion knock tendency as plotted against the R. P. M. of swirl. The maximum combustion knock which is permissible may be found by experiment and this point is designated 26 in the curve shown in Figure 5. By projecting this point on to the axis representing swirl R. P. M. a point 27 is obtained which represents the amount of swirl which is permissible within the combustion chamber. Having found this permissible amount of swirl a point 28 may be found on the curve representing the compression ratio as limited by detonation and by projecting horizontally from point 28 to the axis of the compression ratio a point 29 may be found which designates the correct compression ratio which may be obtained with this amount of swirl. Having found the desired amount of swirl the device for producing this swirl may thus be determined by the combustion knock tendency and detonation characteristics of the engine. By inclining the opening edges 16' of the intake ports 16 of said sleeve valve means a certain predetermined swirl is produced in the engine. After many experiments and various computations it was found that the inclination of the opening edges 16' of the cooperating sleeve valve intake ports should be somewhat less than an angle of 35° with respect to a horizontal plane through the engine extending perpendicular to the cylinder and sleeve valve axes. In order to produce a maximum swirl giving beneficial results without detrimental reactions it was found that the angle of inclination should be at least 10° with respect to this horizontal plane. It was found that an angle of approximately 20° was most desirable for producing the proper amount of swirl which would not produce an objectionable combustion knock but which permits the obtaining of full benefits resulting from the use of a swirling fuel mixture in the combustion chamber with regard to detonation.

Thus the opening edges 16' of the cooperating sleeve valve ports 16 are thus inclined preferably at an angle of approximately 20° with respect to the horizontal plane, the inclined opening edges of these ports being resolved into horizontal and vertical components and the vertical component is the one which must be considered as acting to produce a horizontal swirl of the fuel mixture in the combustion chamber. The angle which was found to be most desirable provides a horizontal component which is greater than the vertical component.

In Figure 4 I have illustrated a construction which includes a manifold structure 30 which cooperates with the intake port 31 of the cylinder block to induce a directional movement to the fuel mixture in the combustion chamber as determined by the combustion knock tendency and detonation characteristics of the engine. It will be noted that the intake port or conduit 31 has an axis 32 extending preferably perpendicularly to the longitudinal plane of the engine containing the cylinder and sleeve axes and the axis of this cylinder port is shown offset from the cylinder and sleeve axes an amount as designated by the character 32'. Corresponding sleeve valve ports 33 are adapted for cooperative association with this cylinder intake port 31 and the fuel mixture is introduced into the combustion chamber in such a manner as to induce the same to swirl in general as indicated by the arrow 34. Obviously the amount of said swirl may be varied by varying the construction of the intake manifold and its relation with respect to the cylinder intake port.

Another modification of my invention is illustrated in Figure 6 in which a plurality of sets of cooperating intake ports are provided in the sleeve valve means and in order to obtain the proper amount of swirl as determined by the combustion knock tendency and detonation characteristics of the engine, one or more of these cooperating sleeve valve ports may be constructed to impart a predetermined swirl to the fuel mixture in said combustion chamber as determined by the aforesaid rules. In this modified construction the said sets of ports are designated 40, 41 and 42 and the illustrated embodiment of my invention shows the ports 41 as being provided with inclined opening edges 43. Obviously more than one of said ports may be provided with inclined opening edges if so desired and the arrangement of said ports is preferably determined by the amount of swirl which is desired to obtain and by experiment it may be found which ports are most desirable to construct with inclined opening edges. Also, it may be found desirable to so time the opening of these sets of valves that the port which is constructed to induce the required swirl may be timed slightly behind or in advance of the other ports which have horizontal opening edges.

It will be thus noted that I have provided a simple device for inducing a predetermined swirl of the fuel mixture in a combustion chamber of the engine as determined by the combustion knock tendency and detonation characteristics of the engine. It may be thus noted that the construction herein illustrated and described provides an engine having generally improved operative characteristics.

It will be apparent to those skilled in the art to which my invention pertains that various modifications and changes may be made therein without departing from the spirit of my invention or from the scope of the appended claims.

What I claim as my invention is:

1. In an internal combustion engine including a cylinder having an intake port, a plurality of reciprocating relatively movable sleeve valve means associated therewith and provided with cooperating intake port means, and means introducing a fuel mixture for combustion in the cylinder through said intake port means, said sleeve port means constructed to impart a directional movement to the fuel mixture as determined by the combustion knock tendency and detonation characteristics of the engine.

2. In an internal combustion engine of the Knight type and including a cylinder having an intake port, a plurality of reciprocating relatively movable sleeve valve means associated therewith and provided with cooperating intake ports, and means introducing a fuel mixture for combustion in the cylinder through said sleeve ports, said sleeve ports constructed to impart swirl to the fuel mixture as determined by the combustion knock tendency and detonation characteristics of the engine.

3. In an internal combustion engine of the Knight type and including a cylinder having an intake port, a plurality of reciprocating relatively movable sleeve valve means associated therewith and provided with cooperating intake ports, and means introducing a fuel mixture for combustion in the cylinder through said sleeve ports, said sleeve ports constructed to impart swirl to the fuel mixture during at least the initial portion of the intake period as determined by the combustion knock tendency and detonation characteristics of the engine.

4. In an internal combustion engine of the Knight type and including a cylinder having an intake port, a plurality of movable sleeve valve means associated therewith and provided with cooperating intake ports, and means introducing a fuel mixture for combustion in the cylinder through said sleeve ports, said sleeve ports constructed to impart swirl to the fuel mixture throughout the intake period as determined by the combustion knock tendency and detonation characteristics of the engine.

5. In an internal combustion engine of the Knight type and including a cylinder having an intake port a plurality of reciprocating relatively movable associated sleeve valve means provided with intake ports, and means introducing a fuel mixture for combustion in the cylinder through said sleeve ports, said sleeve intake ports constructed for cooperative operation whereby to impart directional movement to the fuel mixture as determined by the combustion knock tendency and detonation characteristics of the engine.

6. In an internal combustion engine of the Knight type and including a cylinder having an intake port, a pair of reciprocating relatively movable associated sleeve valve means provided with cooperating intake ports, and means introducing a fuel mixture for combustion in the cylinder through said sleeve ports, said sleeve intake ports constructed to impart swirl to the fuel mixture as determined by the combustion knock tendency and detonation characteristics of the engine.

7. In an internal combustion engine of the Knight type and including a cylinder having an intake port, a pair of moving sleeve valve means associated therewith and provided with cooperating intake ports, and means introducing a fuel mixture for combustion in the cylinder through said sleeve ports, said sleeve intake ports having opening edges inclined to a horizontal plane extending perpendicular to the sleeve and cylinder axes, said inclined edge having a horizontal component greater than the vertical component, whereby to impart swirl to the fuel mixture in said cylinder as determined by the combustion knock tendency and detonation characteristics of the engine.

8. In an internal combustion engine of the Knight type and including a cylinder having an intake port, a pair of moving sleeve valve means associated therewith and provided with cooperating intake ports, and means introducing a fuel mixture for combustion in the cylinder through said sleeve ports, said sleeve intake ports having opening edges inclined at an angle of approximately twenty degrees to a horizontal plane extending perpendicular to the sleeve and cylinder axes, whereby to impart swirl to the fuel mixture in said cylinder as determined by the combustion knock tendency and detonation characteristics of the engine.

9. In an internal combustion engine of the Knight type and including a cylinder having intake port means, a plurality of reciprocating relatively movable sleeve valve means associated therewith and provided with a plurality of sets of cooperating intake ports, and means introducing a fuel mixture for combustion in the cylinder through said sleeve ports, one of said sets of sleeve intake ports constructed to impart directional movement to the fuel mixture as determined by the combustion knock tendency and detonation characteristics of the engine.

10. In an internal combustion engine of the Knight type and including a cylinder having an intake port, sleeve valve means associated therewith and provided with an intake port cooperating with the cylinder intake port, and means for introducing a fuel mixture tangentially to said cylinder whereby to impart swirl thereto as determined by the combustion knock tendency and detonation characteristics of the engine.

ANDRE J. MEYER.